United States Patent
Rakshit et al.

(10) Patent No.: US 10,592,194 B2
(45) Date of Patent: Mar. 17, 2020

(54) METHOD AND SYSTEM FOR MULTIPLE DISPLAY DEVICE PROJECTION

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/958,868

(22) Filed: Apr. 20, 2018

(65) Prior Publication Data
US 2019/0324703 A1    Oct. 24, 2019

(51) Int. Cl.
| | | |
|---|---|---|
| *G06F 3/14* | (2006.01) | |
| *G06F 1/16* | (2006.01) | |
| *G09G 5/391* | (2006.01) | |
| *G03H 1/22* | (2006.01) | |

(52) U.S. Cl.
CPC ............ *G06F 3/1446* (2013.01); *G03H 1/22* (2013.01); *G06F 1/1639* (2013.01); *G06F 1/1686* (2013.01); *G09G 5/391* (2013.01); *G03H 2001/2239* (2013.01); *G09G 2300/026* (2013.01); *G09G 2340/0442* (2013.01)

(58) Field of Classification Search
None
See application file for complete search history.

(56) References Cited

U.S. PATENT DOCUMENTS

| | | | |
|---|---|---|---|
| 7,453,418 B2 | 11/2008 | Palmquist | |
| 8,154,780 B2* | 4/2012 | Cable | G03H 1/22 |
| | | | 359/11 |
| 8,294,749 B2 | 10/2012 | Cable | |
| 8,508,471 B2 | 8/2013 | Suh | |
| 9,325,976 B2* | 4/2016 | Atkins | G09G 3/003 |
| 9,448,756 B2 | 9/2016 | Jung et al. | |
| 10,082,867 B2* | 9/2018 | Zhou | G06F 3/013 |

(Continued)

OTHER PUBLICATIONS

Everspaugh, et al.; The Pythia PRF Service; Proceedings of the 24th USENIX Security Symposium; Aug. 12-14, 2015; 21 pgs.

*Primary Examiner* — Chad M Dicke
(74) *Attorney, Agent, or Firm* — Garlick & Markison; Timothy W. Markison; Timothy D. Taylor (57) ABSTRACT

A method begins by a computing device obtaining a visual file for display, determining to display the visual file in an expanded manner and determining a number of monitors associated with the computing device. The method continues by determining a display window space that extends beyond a display area of at least one monitor. The method continues by determining a first display region of the display window space attributed to the number of monitors within and determining a second display region of the display window space that is outside of the first display region. The method continues by mapping a first and section portion of the visual file to the first and second display regions to produce a first and second visual mapping. The method continues by rendering at least a portion of the visual file onto the display window space in accordance with the first and second visual mappings.

16 Claims, 8 Drawing Sheets

(56) References Cited

U.S. PATENT DOCUMENTS

| | | | | |
|---|---|---|---|---|
| 2002/0167531 | A1* | 11/2002 | Baudisch | G06F 3/1438 345/611 |
| 2006/0268363 | A1* | 11/2006 | Meinders | G06F 3/1423 358/453 |
| 2011/0279687 | A1* | 11/2011 | Liu | H04N 5/2251 348/207.1 |
| 2012/0281026 | A1* | 11/2012 | Atkins | G09G 3/003 345/690 |
| 2013/0033650 | A1* | 2/2013 | Roberts | G09F 19/18 348/744 |
| 2013/0181901 | A1* | 7/2013 | West | G09G 5/14 345/161 |
| 2014/0156470 | A1 | 6/2014 | Raman | |
| 2014/0267434 | A1* | 9/2014 | Kuncl | H04N 21/4122 345/660 |
| 2016/0155410 | A1* | 6/2016 | Nam | G06F 3/1438 715/745 |
| 2016/0253044 | A1 | 9/2016 | Katz | |
| 2016/0349929 | A1* | 12/2016 | Clemons | G06F 3/0481 |

\* cited by examiner

METHOD AND SYSTEM FOR MULTIPLE DISPLAY DEVICE PROJECTION

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to display devices and more particularly to displaying visual files on one or more display devices.

Description of Related Art

Display devices are known to display movies, pictures and other forms of image data. Such display devices range from monitors and projection screens to display devices that include computing devices such as smart televisions, smartphones, laptops, and tablets.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

DETAILED DESCRIPTION OF THE INVENTION

Figure 1:
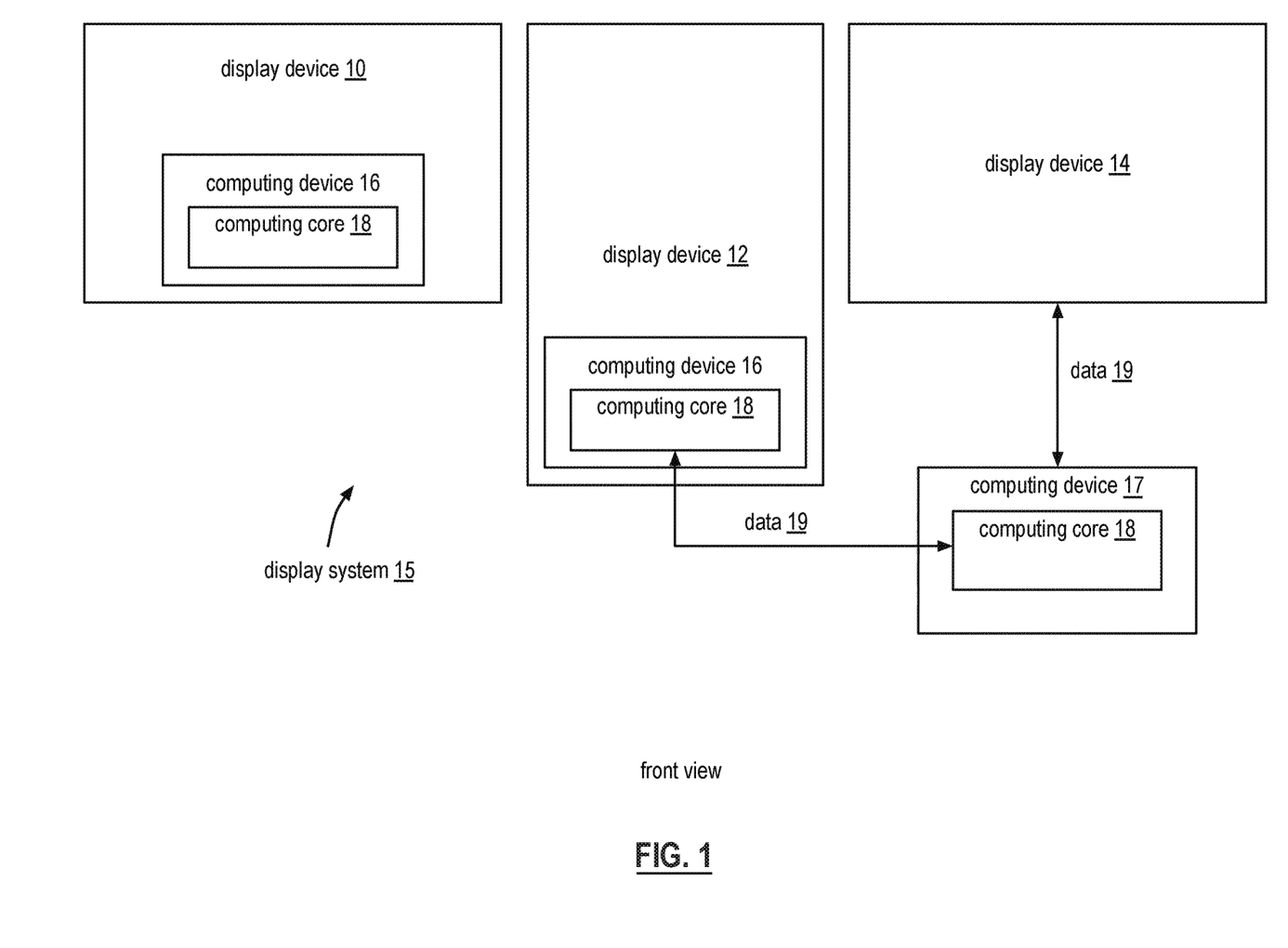
FIG. 1 is a schematic block diagram of an embodiment of a display system in accordance with the present invention.
Figure 6:
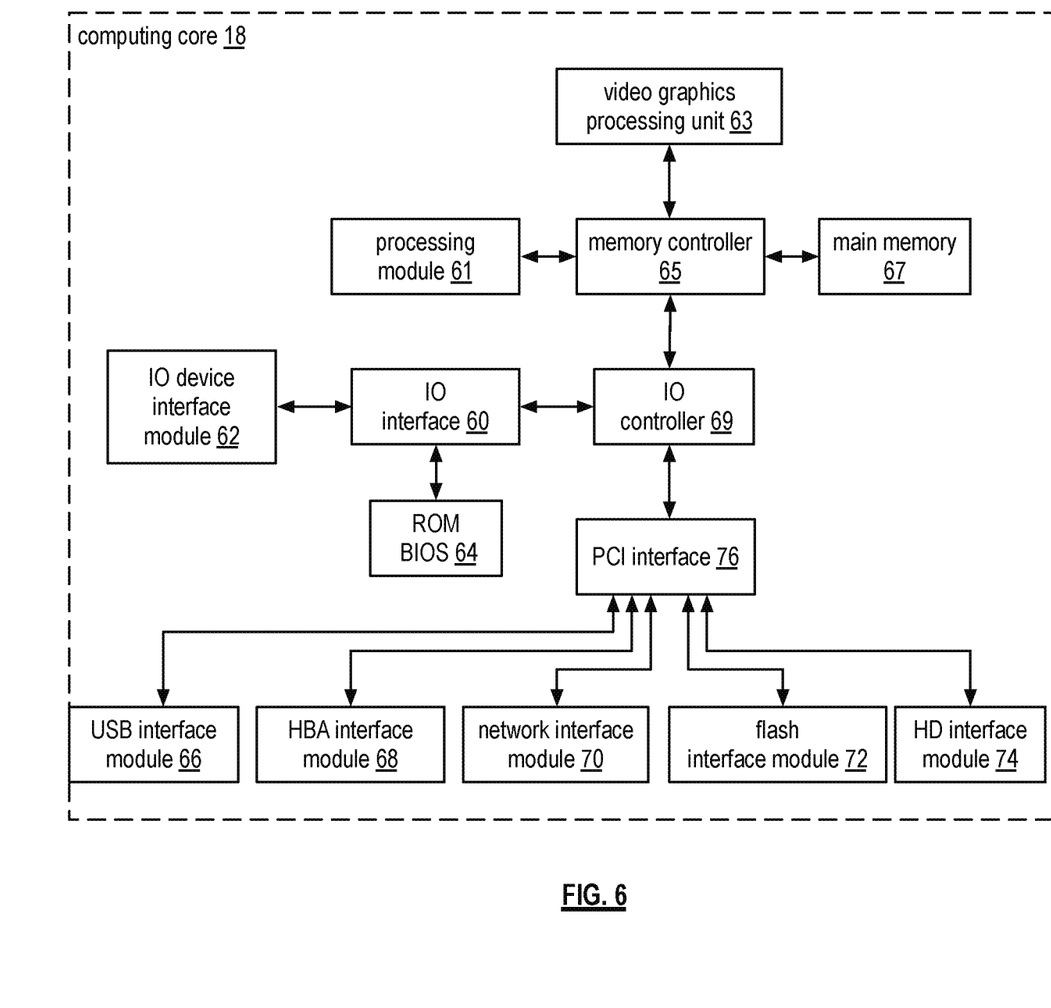
FIG. 6 is a schematic block diagram of an example of a computing core in accordance with the present invention.

FIG. 1 is a schematic block diagram of a front view of a display system 15 that includes a plurality of display devices 10-14 and one or more computing device(s) 16-17. A computing device 16 or 17 includes a computing core 18 (as shown in FIG. 6, or components thereof). The computing devices 16-17 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

Each of the display devices 10-14 may be operably coupled to communicate (e.g., via an interface of FIG. 6) with another one of the display devices 10-14 and the computing device 17. In an example, the communication may be a wired communication and/or a wireless communication (e.g., WLAN, Bluetooth, etc.). In one example, the computing device 17 may be operable to obtain (receive, generate) data 19 and send the data 19 to display device 12-14. In one example, a computing device 16 may obtain data 19 for display on display device 10. The data 19 may include one or more of video data, audio data, and other information (e.g., metadata) related to the video and audio data.

The display devices 10-14 and/or the computing devices 16-17 may be connected to a network (not shown), which may include one or more wireless and/or wire lined communication systems; one or more non-public intranet systems and/or public internet systems; and/or one or more local area networks (LAN) and/or wide area networks (WAN). Each of the display devices 10-14 may include dimensions (e.g., height, length, width, curved, flat, etc.) and may include an orientation (e.g., landscape, portrait, etc.). For example, both the display device 10 and the display device 14 have a landscape orientation and the display device 12 has a portrait orientation. Each of the display devices 10-14 may be one of a television, a laptop, a phone, a tablet, a projector or any other device that displays visual data.

A computing device (e.g., one of the display devices 10-14, an external computing device, etc.) of the display system 15 may operate to obtain (generate, receive) a visual file (e.g., an image, graphics, a picture, a text document, a frame of video, etc.) for display. The computing device may then determine whether to display the visual file in an expanded manner (e.g., on more than one of the display devices 10-14, beyond the borders of one or more of the display devices 10-14). When the computing device determines to display the visual file in the expanded manner, the computing device determines a number of monitors associated with the computing device. For example, the display system 15 may include one monitor (e.g., a digital display device (e.g., LED, OLED, LCD, etc.). As another example, the display system 15 may include two or more (e.g., 3) monitors. In one example, the monitor may be a separate component from the computing device. In another example, the monitor includes the computing device (e.g., a laptop, a tablet, a smartphone, a smart television, etc.). Each of the display devices may contain or be connected to one or more holographic projectors, one or more pico projections and one or more proximity sensing cameras, which are discussed more detail with reference to FIGS. 2A-B.

Figure 2A:
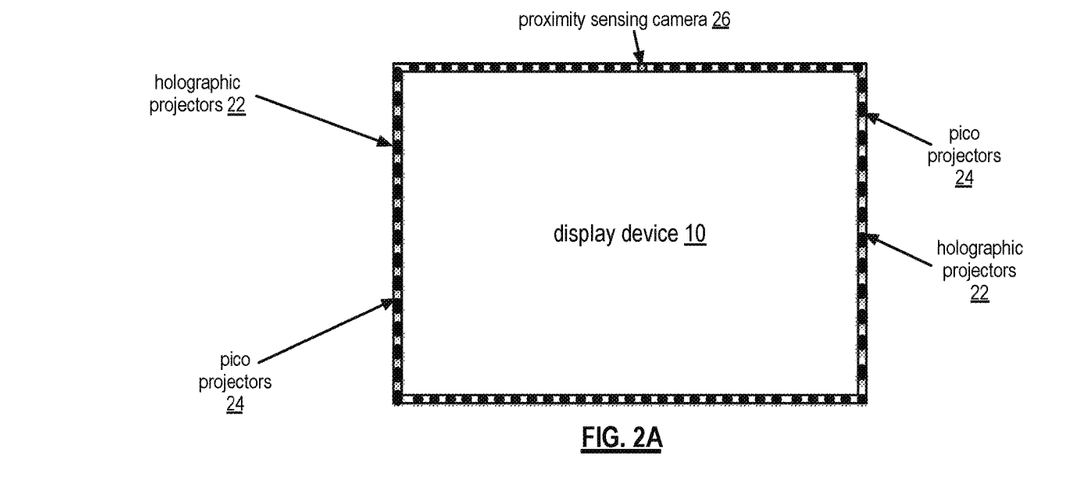
FIG. 2A is a schematic block diagram of an embodiment of a display device in accordance with the present invention.

FIG. 2A is a schematic block diagram of a display device 10 (e.g., one of the display devices 10-14 of FIG. 1) that includes one or more holographic projectors 22, one or more pico projectors 24, and one or more proximity sensing cameras 26. As illustrated, the one or more holographic projectors 22, one or more pico projectors 24, and one or more proximity sensing cameras 26 may be located in a boundary of the display device (e.g., a bezel). In one example, the one or more proximity sensing cameras 26 may be located within the display device (e.g., behind a screen of the display device, etc). As another example, the one or more pico projectors 24, the one or more holographic projectors 22 and/or the one or more proximity sensing cameras 26 may be external to the display device 10.

Figure 2B:
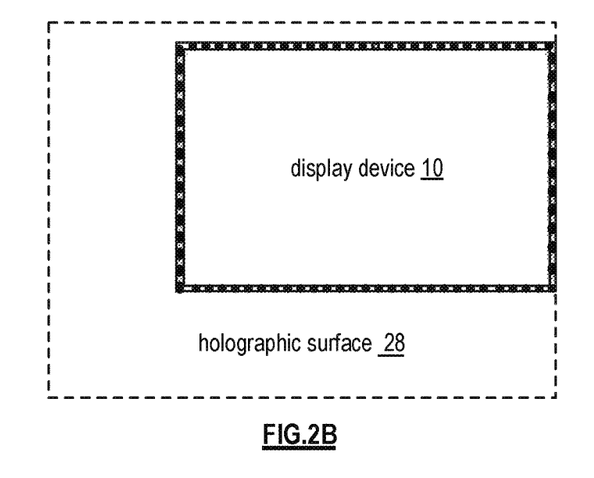
FIG. 2B schematic block diagram of an embodiment of a display device creating a holographic surface in accordance with the present invention.

The one or more holographic projectors 22 may be operable to create a holographic surface 28 around one or more display devices 10-14 as illustrated in FIG. 2B. The pico projectors 24 may be operable to project the visual file onto one or more of an adjacent surface (e.g., proximal surface (e.g., a wall, a screen, etc.)) and the holographic surface 28. The one or more proximity sensing cameras 26 may be operable to identify a relative position and relative dimension of each display device in the display system.

Figure 3A:
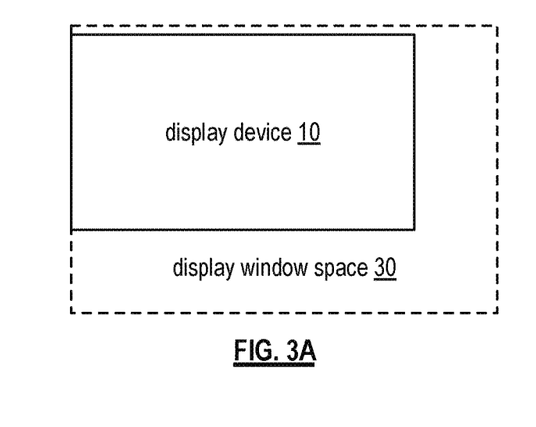
FIG. 3A a schematic block diagram of an embodiment of a display device in a display window space in accordance with the present invention.

FIGS. 3A-D are schematic block diagrams of various display systems 15 that include at least one display device 10-14. FIG. 3A is a schematic block diagram of a display system 15 that includes display device 10 and a display window space 30. For example, the display window space 30 may be a surface in proximity to the display device 10. As another example, the display window space 30 may be a holographic surface. The display window space 30 may extend beyond one or more of a height, a width, and a depth of the display device 10. Determining the dimensions of the display window space is discussed in further detail in reference to FIGS. 4-8B.

Figure 3B:
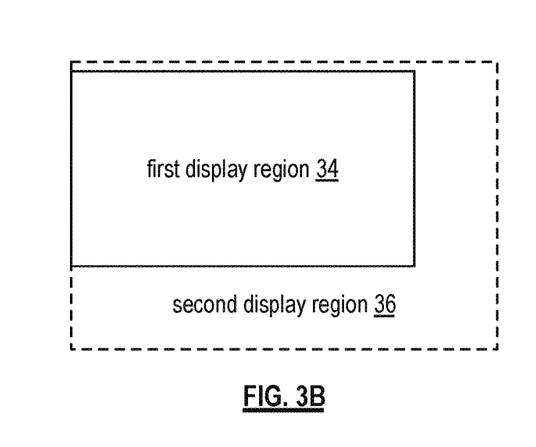
FIG. 3B is a schematic block diagram of an embodiment of display regions of a display window space in accordance with the present invention.

FIG. 3B is a schematic block diagram of a display system 15 that includes a first display region 34 and a second display region 36. The first display region 34 may substantially correspond to a display region of the display device 10 within the display window space 30 of FIG. 3A. The second display region 36 may substantially correspond to the area substantially outside the display region of the display device 10 but that may be within the display window space 30 of FIG. 3A.

Figure 3C:
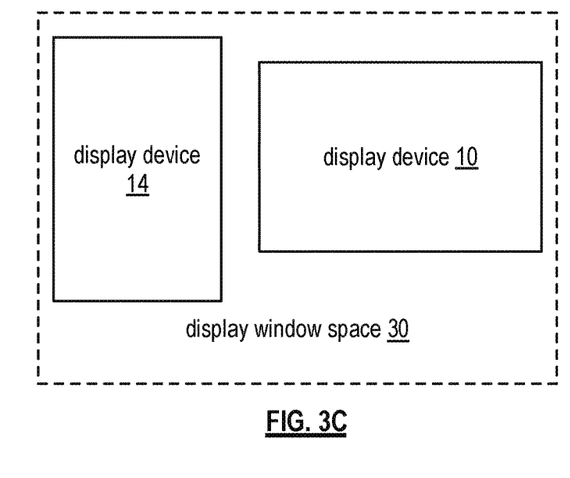
FIG. 3C is a schematic block diagram of an embodiment of a plurality of display devices in a display window space in accordance with the present invention.

FIG. 3C is a schematic block diagram of a display system 15 that includes a plurality of display devices 10, 14 and a display window space 30. As an example, the display window space 30 may be a surface (wall, translucent screen, etc.) in proximity to the display device 10. As another example, the display window space 30 may be the holographic surface 28. The display window space 30 may extend beyond one or more of a height, a width, and a depth of the plurality of display devices 10, 14. Determining the dimensions of the display window space is discussed in further detail in reference to FIGS. 4-8B.

Figure 3D:
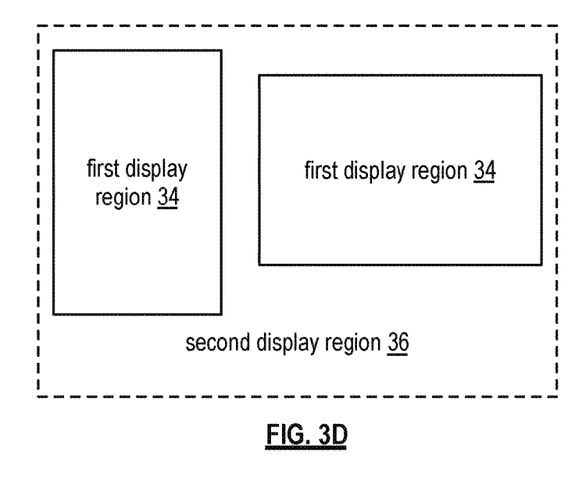
FIG. 3D is a schematic block diagram of another embodiment of display regions of a display window space in accordance with the present invention.

FIG. 3D is a schematic block diagram of a display system 15 that includes a first display region 34 and a second display region 36. The first display region may substantially correspond to a display region of the plurality of display devices 10, 14 within the display window space 30 of FIG. 3C. The second display region 36 may substantially correspond to the area substantially outside the display regions of the plurality of display devices 10,14 but that may be within the display window space 30 of FIG. 3C.

Figure 4:
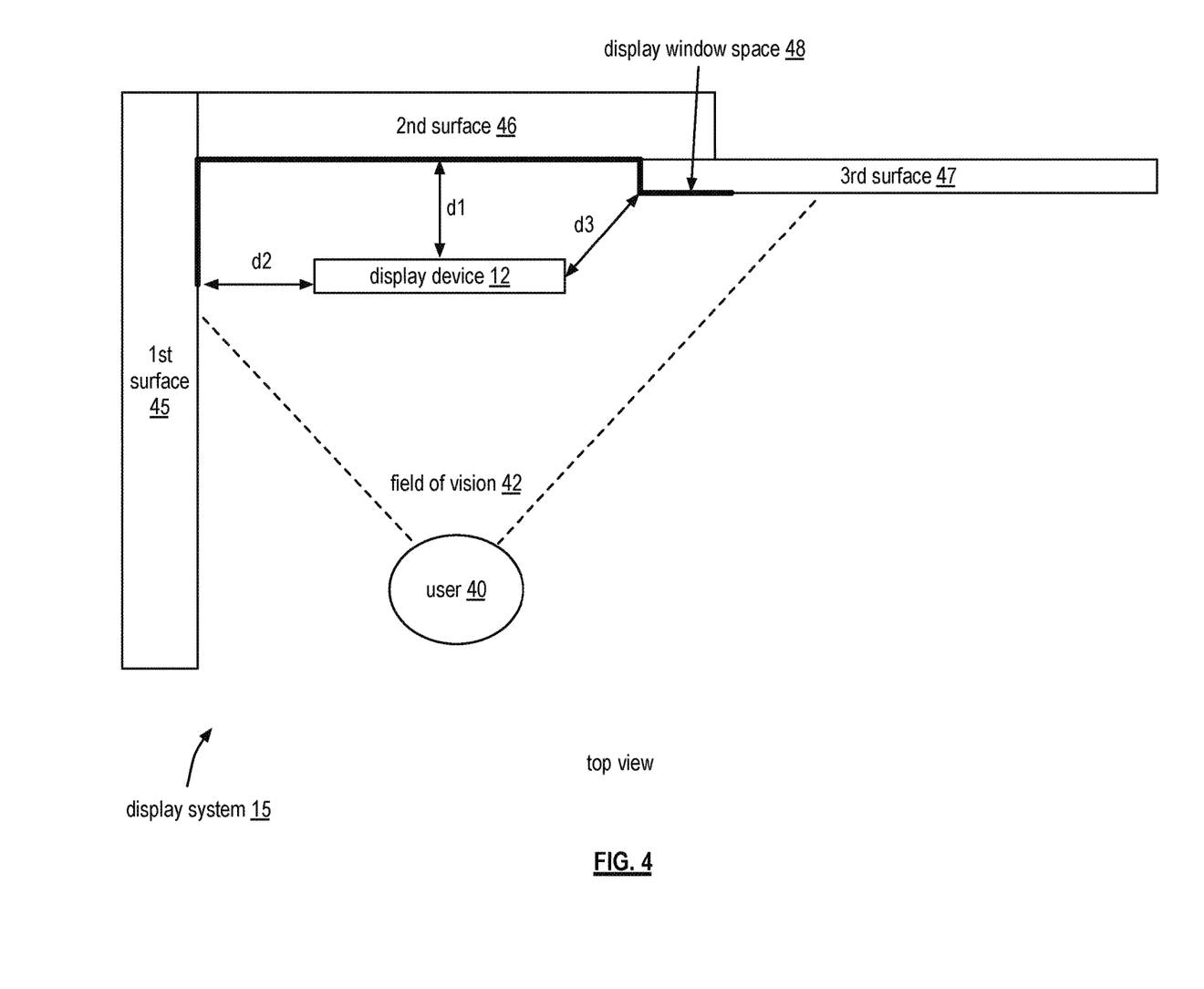
FIG. 4 is a schematic block diagram of another embodiment of a display system in accordance with the present invention.

FIG. 4 is a schematic block diagram of a top view of another embodiment of an example of a display system 15 that includes a display device 12, one or more surfaces 45, 46 and 47 adjacent to the display device 12, a display window space 48, and a user 40. The display device 12 may be positioned adjacent to the one or more surfaces 45-47 by one or more distances (e.g., d1, d2, d3). The user 40 has a field of vision 42. The field of vision 42 may be sensed by a proximity sensing camera 26, which may be located within the display device 12 or externally to the display device 12. The field of vision 42 may be used as a parameter in determining the display window space 58. For example, a computing device may compare a desired window space 58 with the user 50's field of vision to ensure one or more portions of the desired window space 58 are not outside the user 50's field of vision.

Each of the first, second and third surfaces 45-47 may have a plurality of surface dimensions (e.g., height, length, depth, etc.) and the display window space 48 may be displayed on the one or more of the surfaces 45-47. For example, a surface (e.g., first surface 45) may be substantially uniform (e.g., flat, constant slopes, etc.). As another example, a surface (e.g., third surface 47) may not be substantially uniform. The proximity sensing camera 26 may be operable to determine the plurality of surface dimensions such that the display system 15 may display a visual file in an expanded manner (e.g., on the display device 12 and the one or more surfaces 45-47).

Figure 5:
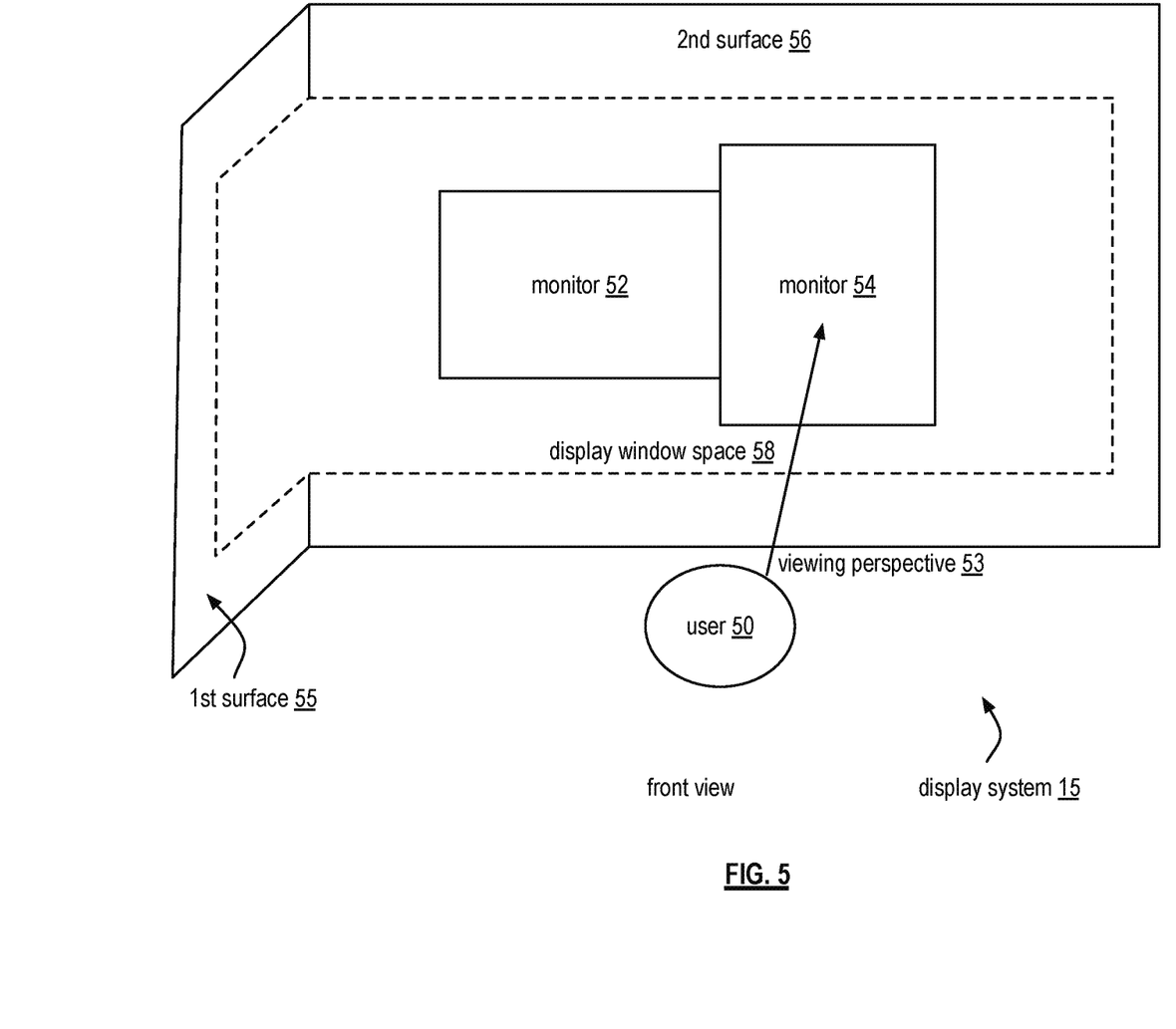
FIG. 5 is a schematic block diagram of another embodiment of a display system in accordance with the present invention.

FIG. 5 is a schematic block diagram of an embodiment of a display system 15 that includes a first surface 55, a second surface 56, a monitor 52, a monitor 54, a display window space 58 and a user 50. Each of the monitors 52 and 54 may be implemented by a display device 10-14 of FIG. 1. Each of the monitors 52-54 (e.g., display devices 12-14) may have different display dimensions (e.g., sizes, shapes, aspect ratios, etc.). Further, each of the monitors 52-54 may have different display scaling. As such, one or more portions of a visual file for display on the display system 15 may not be able to be displayed on aggregated monitors (e.g., monitors 52-54). Further, bezels of the monitors 52-54 may create an obstacle, which may cause a discontinuity in the displaying of the visual file. Still further, a separation (e.g., by a distance) between the monitors 52-54 may also cause the discontinuity in the displaying of the visual file.

Thus, the display system 15 may be operable to calculate the size and dimensions of a virtual canvas to render for a visual file (e.g., an image) based on a relative placement and display dimensions of one or more monitors 52-54 connected to a computing device (e.g., one of display devices 10-14). In some situations, when all entire portions of a visual file (e.g., a frame of a video) may not be able to be rendered on the one or more monitors 52-54 (e.g., display devices 10-14), the display system may be operable to perform prominent object extraction and sizing such that the key portions of the visual file may be displayed across the displays of different dimensions within the display window space 58 (e.g., at least the one or more display devices 10-14).

The display system 15 may also use holographic projectors and pico projectors between one or more display devices creating a seamless canvas to project a visual file across the one or more display devices (e.g., monitors 52-54). The seamless canvas may be customized to both the image and position of the one or more monitors 52-54. The seamless canvas may include at least one monitor and a proximal surface to the at least one monitor. As an example, when the computing device determines to use the proximal surface (e.g., $1^{st}$ and $2^{nd}$ surfaces 55 and 56 (e.g., wall, panel, projection screen, translucent screen, etc.) for the display window space 58, the computing device determines a distance from at least one monitor 52 and 54 to the proximal surface. The computing device may determine projection capabilities of pico-projectors of the display system 15 that are associated with the at least one monitor. The computing device may also determine a size of the display area of the at least one monitor 52 and 54 and the display window space 58 based on the distance from the at least one monitor to the proximal surface, the projection capabilities of the pico-projectors, and the size of the display area of the at least one monitor.

In an example of operation, a computing device (e.g., a monitor 52 or 54, an external computing device (e.g., computing device 16-17, a tablet, a phone, a laptop, a desktop, etc.) of the display system 15 obtains a visual file for display. The computing device then determines whether to display the visual file in an expanded manner (e.g., outside of the monitor(s) 52 and 54 display area(s)). For example, the computing device may determine to display the visual file in an expanded manner by receiving a command. As another example, the computing device may determine to display the visual file in an expanded manner based on a default setting. As yet another example, the computing device may determine to display the visual file in an expanded manner based on metadata of the visual file.

Having determined to display the visual file in an expanded manner, the computing device may determine a number of monitors 52-54 that are associated with the computing device (e.g., a display device 10-14, a monitor 52-54). For example, the computing device may determine the number of monitors by being operably coupled to (e.g., within (e.g., via a bus), wireless connection, wired connection, etc.) to the number of monitors 52-54. As another example, the computing device may determine the number of monitors 52-54 (e.g., 1, 2, 3, etc.) by being operably coupled to one or more proximity sensing cameras 26. The proximity sensing cameras 26 may be operable to identify the number of monitors 52-54 and a relative position and dimension of the monitors 52-54 to create a mapping of which monitors 52-54 are being used and where the monitors 52-54 are positioned.

When the display system 15 includes at least two monitors (e.g., monitors 52-54), a computing device of the display system 15 may determine a size the display area of each of the at least two monitors, a relative positioning of the at least two monitors, and the canvas projection range of the holographic projectors 22 associated with each of the at least two monitors. The computing device may also determine the display window space 58 based on the canvas projection range of the holographic projectors 22 associated with each of the at least two monitors, the size of the display area of each of the at least two monitors, and the relative positioning of the at least two monitors.

Having determined the number of monitors 52-54, the computing device may then determine a display window space 58 (e.g., virtual canvas, adjacent surface, etc.) includes an area that extends beyond at least one the height and a width of a display area of at least one monitor of the number of monitors 52-54. In one example, the computing device may determine to use holographic projectors 22 associated with the at least one monitor of the number of monitors 52-54 to establish the second display region 36 (e.g., a holographic surface 28) of the display window space 58. When the computing device determines to use the holographic projectors 22, the computing device may determine a canvas projection range (desired, max, etc.) of the holographic projectors 22. The computing device may also determine a size of the display area of the at least one monitor of the number of monitors 52-54. The computing device may further determine the display window space 58 based on the canvas projection range and the size of the display area of the at least one monitor of the number of monitors 52-54. Having established the second display region, the computing device may then be operable to command pico projectors 24 to project the visual file onto the holographic surface 28.

As one example, the display window space 58 may include a surface adjacent to the one or more monitors 52-54. A computing device of the display system 15 may utilize one or more proximity sensors 26 to determine the relative position of a user 50 in order to determine an available display window space 58. For example, the computing device may determine a viewing perspective 53 of at least one monitor (e.g., display device) and determine the display window space 58 further based on the viewing perspective 53. The computing device may also determine a distance the user is from the one or more display devices and available spatial parameters (e.g., distance to one or more objects that may interfere with a holographic canvas, size of one or more adjacent surfaces, etc.) operable to contain the display window space 58. The computing device may then be operable to command pico projectors 24 to project the visual file onto the adjacent surface.

In one example, the computing device may determine an aspect ratio of the visual file and may determine an aspect ratio of the display window space 58. When the aspect ratio of the visual file is not substantially proportional to the aspect ratio of the display window space 58, the computing device may crop the visual file to have a modified aspect ratio that is substantially proportional to the aspect ratio of the display window space 58. For example, the computing device may analyze the visual file to determine a most germane portion of file and crop one or more least germane portion(s). Having cropped the visual file, the computing device may map a first portion of the visual file with the modified aspect ratio to the first display region 34 and map a second portion of the visual file with the modified aspect ratio to the second display region 36.

The computing device may determine a first display region 34 (e.g., display area of the monitors 52 and 54) of the display window space 58. For example, the first display region 34 may be contributed to a display area of the number of display devices 12 and 14 (e.g., monitors) within the display window space 58. The computing device may then determine a second display region 36 of the display window space 58 that is outside of the first display region 34. For example, the computing device may determine the second display region 36 to be a difference between the display window space 58 and one or more areas that correspond to display areas (e.g., visible screens) of monitors 52-54.

Having determined the first and second display regions 34 and 36, the computing device may map a first portion of the visual file (e.g., data 19) to the first display region 34 (e.g., display of display device 12) to produce a first visual mapping. In an example, the computing device may determine the first portion of visual file based on the first display region 34, the visual file, and the display window space 58. In another example, the computing device may determine the second portion of visual file based on the second display region 36, the visual file, and the display window space 58. The computing device may also map a second portion of the visual file to the second display region 36 (e.g., display of display device 14) to produce a second visual mapping. Note the first portion and the second portion of the visual file may each include multiple sections of the visual file.

The computing device may render at least a portion (e.g., of the first and second portions) of the visual file on to the display window space 58 in accordance with the first and second visual mappings. For example, the computing device may enable the holographic projectors 22 associated with the at least one monitor 52-54 to create a holographic canvas for the second display region 36 of the display window space 58. Note the computing device may project the holographic canvas in front of the monitor, adjacent to, and/or behind the monitor. Further note the canvas may be a flat surface or curved surface to enhance viewing from a viewing perspective. The computing device may also enable pico-projectors associated with the at least one monitor 52-54 to project the second portion of the visual file on to the holographic canvas. The computing device may then send the first portion of the visual file to the at least one monitor for display thereon.

FIG. 6 is a schematic block diagram of an embodiment of a computing core 18 that includes a processing module 61, a memory controller 65, main memory 67, a video graphics processing unit 63, an input/output (IO) controller 69, a peripheral component interconnect (PCI) interface 76, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, and a hard drive (HD) interface module 74.

Figure 7:
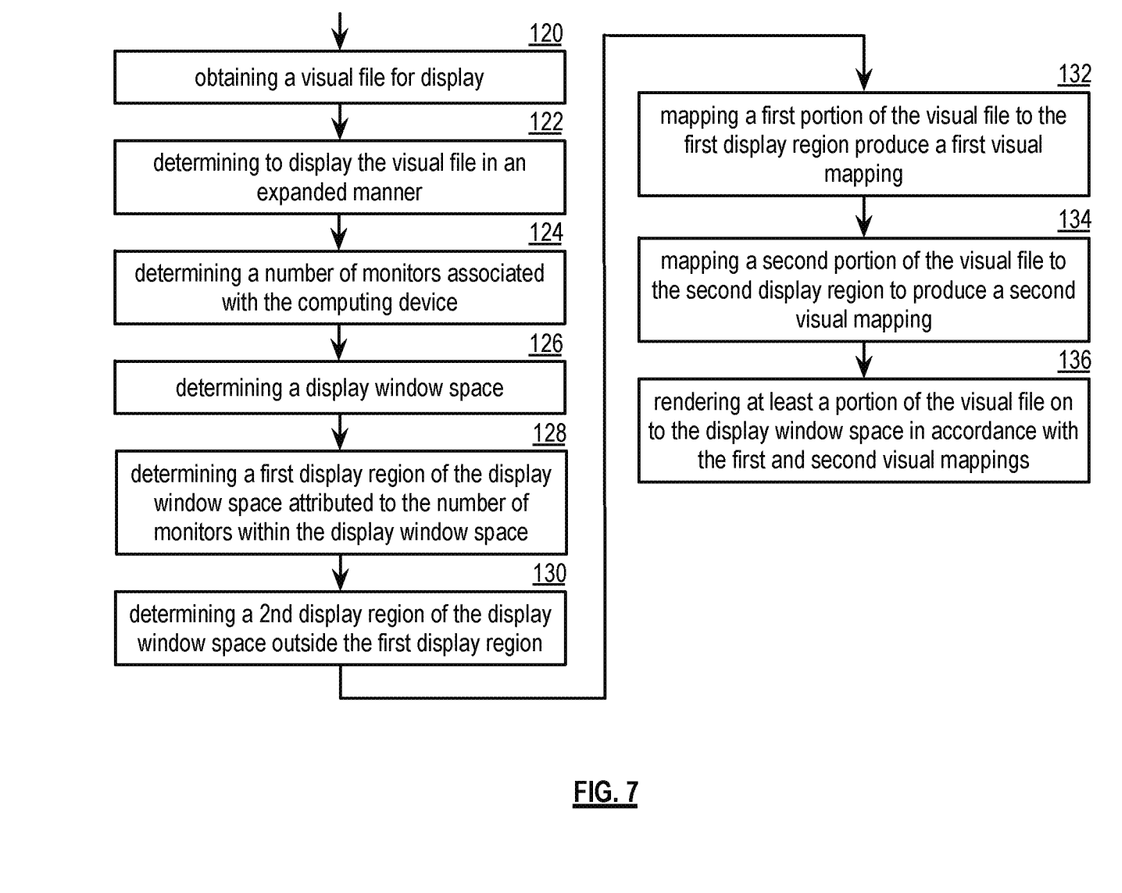
FIG. 7 is a schematic block diagram of an example of a method of displaying a visual file in accordance with the present invention.

FIG. 7 is a schematic block diagram of an example of a method, for execution by a computing device, of displaying a visual file that begins at step 120, where a computing device of a display system obtains a visual file for display. The method continues at step 122, where the computing device determines to display the visual file in an expanded manner. The method continues at step 124, where the computing device determines the number of monitors associated with the computing device.

The method continues with step 126, where the computing device determines the display window space that may extend beyond at least one of a height and a width of a display area of at least one of the monitors. The determining the display window space may be based on determining to use holographic projectors and/or a proximal surface to create a portion of the display window space, which is discussed in further detail in reference to FIGS. 8A-B. The determining the display window space may be further based on determining a viewing perspective of a user of the at least one monitor and generating the display window space further based on the viewing perspective.

The method continues with step 128, where the computing device determines a first display region of the display window space. The first display region may be attributed to the number of monitors within the display window space. The method continues to step 130, where the computing device determines a second display region of the display window space. For example, the second display region may be the part of the display window space that is outside of the first display region. The determining the second display region may be based on determining to use holographic projectors and/or a proximal surface for the second display region of the display window space, which is discussed in further detail in reference to FIGS. 8A-B.

The method continues at step 132, where the computing device produces a first visual mapping by mapping a first portion of the visual file to the first display region. The method continues with step 134, where the computing device produces a second visual mapping by mapping a second portion of the visual file to the second display region. The method continues at step 136, where the computing device renders at least a portion of the visual file onto the display window space accordance with the first and second visual mappings.

Figure 8A:
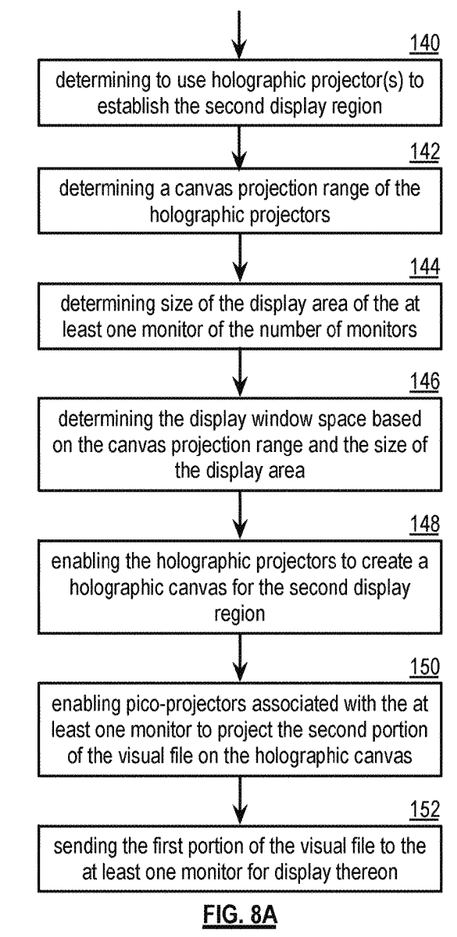
FIG. 8A is a schematic block diagram of an example of a method of using holographic projectors for displaying a visual file in accordance with the present invention.

FIG. 8A is a schematic block diagram of an example of a method of using holographic projectors for displaying a visual file. The method begins or continues with step 140, where a computing device determines to use holographic projectors (e.g., associated with at least one monitor) to establish the second display region. The method continues with step 142, where the computing device determines a canvas projection range of the holographic projectors. The method continues with step 144, where the computing device determines a size of the display area of at least one monitor of a number of monitors.

The method continues with step 146, where the computing device determines the display window space based on the canvas projection range and the size of the display area of the at least one monitor. The method continues with step 148, where the computing device enables the holographic projectors associated with the at least one monitor to create a holographic canvas for the second display region of the display window space. Having produce the holographic canvas, the method continues with step 150, where the computing device enables pico-projectors associated with the at least one monitor to project the second portion of the visual file on to the holographic canvas. The method continues with step 152, where the computing device sending the first portion of the visual file to the at least one monitor for display thereon.

Figure 8B:
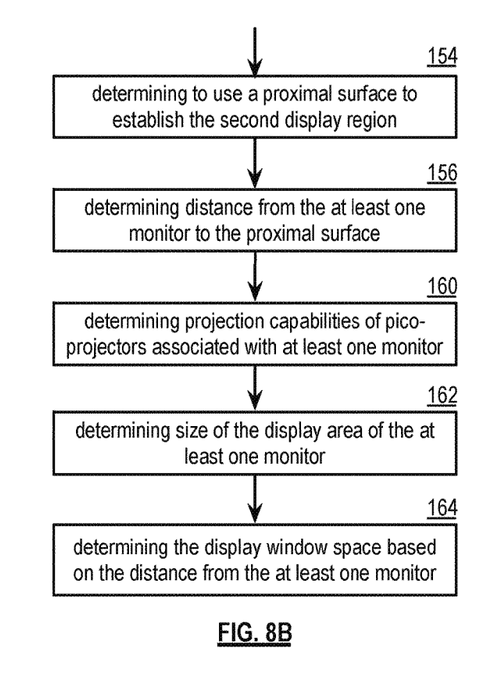
FIG. 8B is a schematic block diagram of an example of a method of using a proximal surface for displaying a visual file in accordance with the present invention.

FIG. 8B is a schematic block diagram of an example of a method of using a proximal surface (e.g., wall, panel, projection screen, translucent screen, etc.) for displaying a visual file. The method begins or continues with step 154, where a computing device determines to use a proximal surface to establish the second display region (e.g., outside a display area of at least one monitor) of a display window space. The method continues with step 156, where the computing device determines one or more distances from the at least one monitor to the proximal surface. The method continues with step 160, where the computing device determines projection capabilities of pico-projectors associated with the at least one monitor. The method continues with step 162, where the computing device determines a size of the display area of the at least one monitor. The method continues with step 164, where the computing device determines the display window space. For example, the determining may be based on the distance from the at least one monitor to the proximal surface. As another example, the determining may be based on the projection capabilities of the pico-projectors. As yet example, the determining may be based on the size of the display area of the at least one monitor.

Note that in some example, a holographic canvas and a proximal surface may be used in combination for the second display region. For example, a holographic canvas may be used for bezel portion(s) of one or more monitors and a proximal surface may be use for portions of the display window space that is outside the one or more monitors. As another example, a holographic canvas may be used for a portion of the second display region of a display window space that does not include a proximal surface, and the proximal surface may be used for a remaining portion of the second display region of the display window space.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:
   obtaining a visual file for display;
   determining to display the visual file in an expanded manner;
   determining a number of monitors associated with the computing device;
   determining a display window space that extends beyond at least one of a height and a width of a display area of at least one monitor of the number of monitors;
   determining a first display region of the display window space attributed to the number of monitors within;
   determining a second display region of the display window space that is outside of the first display region;
   determining whether to use holographic projectors associated with the at least one monitor of the number of monitors or a proximal surface to establish the second display region;
   when using the holographic projectors to establish the second display region:
      determining a canvas projection range of the holographic projectors, wherein the canvas projection range is utilized to determine a holographic canvas size for establishing the second display region;
      determining size of the display area of the at least one monitor of the number of monitors; and
      determining the display window space based on the holographic canvas size and the size of the display area of the at least one monitor of the number of monitors;
   mapping a first portion of the visual file to the first display region to produce a first visual mapping;
   mapping a second portion of the visual file to the second display region to produce a second visual mapping; and
   rendering at least a portion of the visual file on to the display window space in accordance with the first and second visual mappings.

2. The method of claim 1 further comprises:
   determining the first display region based on the size of the display area of the at least one monitor; and
   determining the second display region based on a difference between the display window space and the size of the display area of the at least one monitor.

3. The method of claim 1 further comprises:
   determining the first portion of the visual file based on the first display region, the visual file, and the display window space; and
   determining the second portion of the visual file based on the second display region, the visual file, and the display window space.

4. The method of claim 1 further comprises:
   determining an aspect ratio of the visual file;
   determining an aspect ratio of the display window space; and
   when the aspect ratio of the visual file is not substantially proportional to the aspect ratio of the display window space:
      cropping the visual file to have a modified aspect ratio that is substantially proportional to the aspect ratio of the display window space;
      mapping a first portion of the visual file with the modified aspect ratio to the first display region; and
      mapping a second portion of the visual file with the modified aspect ratio to the second display region.

5. The method of claim 1 further, wherein the rendering at least a portion of the visual file comprises:

enabling the holographic projectors associated with the at least one monitor to create a holographic canvas for the second display region of the display window space;

enabling pico-projectors associated with the at least one monitor to project the second portion of the visual file on to the holographic canvas; and sending the first portion of the visual file to the at least one monitor for display thereon.

6. The method of claim 1 further comprises:

when the number of monitors includes at least two monitors:

determining size of the display area of each of the at least two monitors;

determining relative positioning of the at least two monitors;

determining the canvas projection range of the holographic projectors associated with each of the at least two monitors; and determining the display window space based on the holographic canvas size of the holographic projectors associated with each of the at least two monitors, the size of the display area of each of the at least two monitors, and the relative positioning of the at least two monitors.

7. The method of claim 1 further comprises:

when using the proximal surface to establish the second display region:

determining distance from the at least one monitor to the proximal surface;

determining projection capabilities of pico-projectors associated with the at least one monitor;

determining size of the display area of the at least one monitor; and determining the display window space based on the distance from the at least one monitor to the proximal surface, the projection capabilities of the pico-projectors, and the size of the display area of the at least one monitor.

8. The method of claim 1 further comprises:

determining a viewing perspective of the at least one monitor; and determining the display window space further based on the viewing perspective.

9. A computing device comprises:

memory;

an interface; and a processing module operably coupled to the memory and the interface, wherein the processing module is operable to:

obtain a visual file for display;

determine to display the visual file in an expanded manner;

determine a number of monitors associated with the computing device;

determine a display window space that extends beyond at least one of a height and a width of a display area of at least one monitor of the number of monitors;

determine a first display region of the display window space attributed to the number of monitors within;

determine a second display region of the display window space that is outside of the first display region;

determining whether to use holographic projectors associated with the at least one monitor of the number of monitors or a proximal surface to establish the second display region;

when using the holographic projectors to establish the second display region:

determining a canvas projection range of the holographic projectors, wherein the canvas projection range is utilized to determine a holographic canvas size for establishing the second display region;

determining size of the display area of the at least one monitor of the number of monitors; and determining the display window space based on the holographic canvas size and the size of the display area of the at least one monitor of the number of monitors;

map a first portion of the visual file to the first display region to produce a first visual mapping;

map a second portion of the visual file to the second display region to produce a second visual mapping; and render at least a portion of the visual file on to the display window space in accordance with the first and second visual mappings.

10. The computing device of claim 9, wherein the processing module is further operable to:

determine the first display region based on the size of the display area of the at least one monitor; and determine the second display region based on a difference between the display window space and the size of the display area of the at least one monitor.

11. The computing device of claim 9, wherein the processing module is further operable to:

determine the first portion of the visual file based on the first display region, the visual file, and the display window space; and determine the second portion of the visual file based on the second display region, the visual file, and the display window space.

12. The computing device of claim 9, wherein the processing module is further operable to:

determine an aspect ratio of the visual file;

determine an aspect ratio of the display window space; and when the aspect ratio of the visual file is not substantially proportional to the aspect ratio of the display window space:

crop the visual file to have a modified aspect ratio that is substantially proportional to the aspect ratio of the display window space;

map the first portion of the visual file with the modified aspect ratio to the first display region; and map the second portion of the visual file with the modified aspect ratio to the second display region.

13. The computing device of claim 9 further, wherein the processing module is further operable to render at least a portion of the visual file by:

enabling the holographic projectors associated with the at least one monitor to create a holographic canvas for the second display region of the display window space;

enabling pico-projectors associated with the at least one monitor to project the second portion of the visual file on to the holographic canvas; and sending, via the interface, the first portion of the visual file to the at least one monitor for display thereon.

14. The computing device of claim 9, wherein the processing module is further operable to:

when the number of monitors includes at least two monitors:

determine a size of the display area of each of the at least two monitors;

determine a relative positioning of the at least two monitors;

determine the canvas projection range of the holographic projectors associated with each of the at least two monitors; and determine the display window space based on the holographic canvas size of the holographic projectors associated with each of the at least two monitors, the size of the display area of each of the at least two monitors, and the relative positioning of the at least two monitors.

15. The computing device of claim 9, wherein the processing module is further operable to:
    when using the proximal surface to establish the second display region:
        determine distance from the at least one monitor to the proximal surface;
        determine projection capabilities of pico-projectors associated with the at least one monitor;
        determine size of the display area of the at least one monitor; and
        determine the display window space based on the distance from the at least one monitor to the proximal surface, the projection capabilities of the pico-projectors, and the size of the display area of the at least one monitor.

16. The computing device of claim 9, wherein the processing module is further operable to:
    determine a viewing perspective of the at least one monitor; and
    determine the display window space further based on the viewing perspective.

* * * * *